Feb. 23, 1954     H. E. DARNEY     2,670,439
APPARATUS FOR IRRADIATING LIQUIDS
Filed July 5, 1950
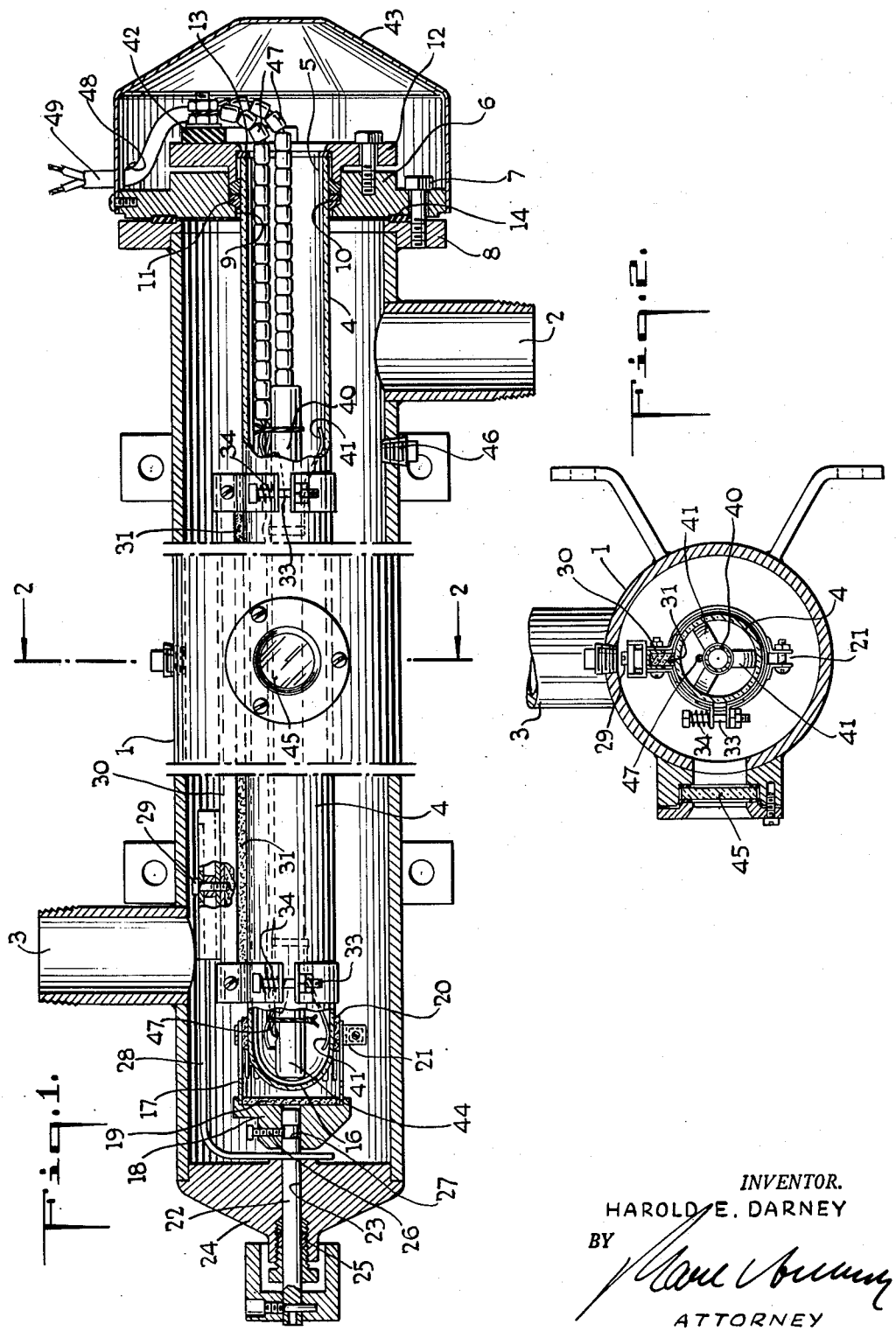
INVENTOR.
HAROLD E. DARNEY
BY
ATTORNEY Patented Feb. 23, 1954

2,670,439

UNITED STATES PATENT OFFICE 2,670,439

APPARATUS FOR IRRADIATING LIQUIDS

Harold E. Darney, Bloomfield, N. J., assignor to Hanovia Chemical and Mfg. Company, Newark, N. J., a corporation of New Jersey Application July 5, 1950, Serial No. 172,127

5 Claims. (Cl. 250—43)

This invention relates to the treatment of liquids with ultraviolet radiations and is concerned in particular with improved apparatus for sterilizing liquids such as, for example, water, fruit juices, and the like.

The employment of ultraviolet radiations for the sterilization of liquids has many practical advantages over other methods in common use. Among these advantages is that constant purity may be had in beverage and food-processing industries, without altering the palatability of the liquid. Also nothing need be added to the liquid which would change its chemical composition, and any desired degree of sterilization is obtainable depending on the rate of flow of the liquid past the source of the radiations.

It is a general object of this invention to provide a new and improved apparatus for irradiating liquids that is simple in construction and capable of being manufactured at a low cost. A further object is the provision of an apparatus having its parts so arranged that assembly and disassembly thereof may be accomplished easily.

Further objects and various advantages of the invention will appear from the following detailed description taken in connection with the accompanying drawing in which:

Figure 1 shows a preferred form of my invention, partly in section and partly in elevation, and Figure 2 is a cross-sectional view taken on the line 2—2 of Fig. 1.

Referring to the drawing there is shown a tubular jacket 1, which is formed preferably of stainless steel, having an inlet pipe 2 located near one end thereof for connecting the jacket to a supply of the liquid to be treated, and an exhaust pipe 3 attached to the jacket near its opposite end for conveying the liquid to a point of use.

Concentrically aligned with the jacket 1 is an inner tube 4 made of a material that is transparent to ultraviolet radiations, such as fused quartz, glass, or any of the transparent synthetic resins that are well known for this purpose to those skilled in the art. This inner tube is supported at its open end 5 by the plate 6 which is fixed by bolts 7 to the outwardly extending flange 8 on the end of the jacket 1. In the plate 6 is a cylindrical bore 9 which is adapted to receive the open end of the inner tube 4. An annular recess 10 in the walls of the bore contains the packing rings 11 which are secured in sealing position around the tube 4 by the gland 12 in an obvious manner. The packing gland 12 supports a shock gasket 13 for the end of the tube and a gasket 14 is provided to form a fluid tight connection between the adjacent faces of the plate 6 and the flange 8.

The closed end 16 of the transparent inner tube 4 carries a ferrule assembly comprising a pronged metal sleeve 17 and a base member 18 with a felt disc 19 in the base of the ferrule. Between the ends of the prongs on the sleeve 17 and the tube 4 is a glass fibre cushion 20. Said assembly is fastened to the tube by means of the clamp 21 which is drawn tightly around said prongs to prevent relative movement between the assembly and the tube.

The tube 4 and the ferrule assembly are supported at the outlet end of the jacket 1 by a rotatable shaft 22, which passes through the central bore 23 in the end wall 24 and is supported by the packing rings 25. The inner end of the shaft 22 extends into and is free to rotate in the base member 18 of the ferrule assembly, axial movement thereof with respect to the base member being prevented by the screw 26 and annular groove 27.

From time to time, deposits from the treated liquid that form on the outer surface of the tube 4 should be removed, otherwise they would substantially reduce the intensity of the radiations that are emitted from the ultraviolet lamp that constitutes an element of the irradiation apparatus of this invention and is described later in this specification. Removal of these deposits is accomplished by means of a wiping device that may be manually operated and which includes an arm 28 that is secured to the shaft 22 so as to rotate therewith. Said arm is pivotally connected by means of the pin 29 to a channel member 30 that supports the wiper 31 which consists of felt or like material. Fastened near each end of the channel member is a band clamp 32. These band clamps are maintained under tension around the tube by means of the tightening screw 33 and spring 34, which cause the wiper 31 to be slightly compressed against the outer surface of the tube and yet allow free rotation of the band clamps about the tube.

It is important that the pivot pin 39 be located nearer to one of the band clamps than to the other, rather than being spaced equidistantly between the clamps. By locating the clamps with respect to the pivot pin in this manner it is possible to obtain a more efficient cleaning of the tube with the wiper. This is so because the channel member which carries the wiper is pulled out of alignment with the axis of the tube when it is rotated about the tube in first one and then the opposite direction due to the lagging of the band clamp that is farther removed from the pivot pin whereby the wiper partially rotates about the pivot pin as it is drawn over the surface of the tube.

After the inner tube is fitted in place in the jacket, i. e. by inserting the closed end of the tube, with its wiping mechanism and shaft attached, into the jacket toward the end wall 24, a tubular ultraviolet ray lamp 40 is placed in the inner tube and is maintained in position along the axis of the inner tube by a suitable supporting means, such as for example, the spider clamps 41. The ultraviolet ray lamp 40 includes the usual electrodes, ionizable medium, e. g. mercury, and a starting gas within an envelope of ultraviolet ray transmissive material, e. g. fused quartz, all as is well known to those skilled in the art so that further description thereof is believed to be unnecessary. The lead wires 47 from the lamp may be connected to a terminal block 42 formed of insulating material which is positioned in a dome cover 43 that may be fastened to the outer rim of the plate 6 as shown. The dome cover 43 is provided with a slot 48, for admitting the cable 49 from the source of power to the terminal block 42. The end of the lamp may be provided with a protective cap 44 composed of a refractory material.

The inner tube 4 provides protection for the lamp from sudden changes in the temperature of the liquid undergoing treatment that passes through the annular chamber between the outer surface of the tube and the inside walls of the jacket 1. If the liquid were allowed to directly contact the envelope of the lamp, it would cause the metal vapor within the lamp envelope to condense with a consequent reduction in the lamp wattage. For determining whether the lamp is operating satisfactorily a window 45 may be provided in the walls of the jacket and a drain plug 46 is included for emptying the irradiation chamber. This plug may also be used for introducing a gas to aerate the liquid if desired while it is being irradiated.

From the above description, it will be seen that I have provided a simple and convenient device for irradiating liquids. With the arrangement as described the lamp provides ultraviolet radiations for sterilization purposes and it may be removed without disturbing any of the other elements of the apparatus. When it is desired to completely clean the apparatus, the inner tube and the wiping mechanism may be withdrawn from the jacket as a single unit thereby greatly facilitating the disassembling and subsequent assembling operations. Having thus described my invention, what I claim as new and desire to secure by Letters Patent is:

1. Apparatus for irradiating a liquid comprising concentric jackets forming a chamber therebetween, a supply pipe connected near one end of the outer jacket and an exhaust pipe connected to the opposite end thereof, the inner jacket consisting of an ultraviolet ray transmissive material, an ultraviolet ray lamp within said inner jacket, a ferrule clamped to one end of said inner jacket and having a rotatable shaft extending therefrom substantially along the line of the axis of said inner jacket and through an end wall of said outer jacket, a supporting arm connected to and rotatable with said shaft, a wiper pivotally mounted to said arm, and a band clamp carried by said wiper, said clamp being spaced from the pivot mounting of said wiper and drawn around said inner jacket.

2. Apparatus for irradiating a liquid comprising substantially horizontal elongated jacket having an inlet pipe and an exhaust pipe connected near opposite ends thereof, end walls for said jacket having central bores, a tube formed of ultraviolet ray transmissive material having a closed end and an open end, rotatable shaft mounted on said closed end, said shaft extending through the bore of one of said end walls, said open end of said tube extending out through the bore of the other of said end walls, packing means in said bores for sealing said end walls against leaks, a tubular ultraviolet ray lamp insertable in the open end of said tube, a supporting arm connected to and rotatable with said shaft, a flexible wiper mounted on said arm, and band means around said tube for compressing said wiper against the outer surface of said tube.

3. Apparatus for subjecting a liquid to ultraviolet radiations comprising a substantially horizontal metal cylinder having an inlet pipe and an exhaust pipe connected near opposite ends thereof, head members, each of said members having a central bore and mounted one at each end of said cylinder, a quartz tube with a ferrule mounted at one end thereof, a rotatable shaft carried by said ferrule and extending in an opposite direction to said tube but substantially along the line of the axis of said tube, said tube being arranged concentric to said cylinder with said shaft extending through the central bore of one of said head members and with the opposite end of said tube extending through the bore in the other of said head members, packing means in said bores for sealing said head members against leakage, a tubular ultraviolet ray lamp arranged within said tube along the axis thereof and spaced from the inside walls of said tube and a wiping mechanism rotatable with said shaft and extending along the outer surface of said tube and carrying a spring closed band clamp that is drawn around said tube.

4. A device for cleaning the outer surface of a tube including a ferrule mountable on one end thereof, a rotatable shaft extending from said ferrule and substantially along the line of the axis of said tube, a supporting arm affixed to said shaft so as to rotate therewith, a wiper blade of deformable material pivotally mounted to said arm, a band clamp connected to said blade and arranged so that it may be drawn around said tube, and means for resiliently holding said clamp in its closed position.

5. A device for cleaning the outer surface of a tube including a base member having a cylindrical sleeve mounted on one side thereof, the outer end of said sleeve being slotted to form a plurality of prongs, a band around said prongs for clamping said sleeve on the end of said tube, a shaft rotatably mounted on the other side of said base member and extending substantially along the line of the axis of said sleeve, a supporting member integral with said shaft, a channel bar pivotly mounted on said supporting member and carrying a deformable material, and a band clamp attached to said bar and having spring means for closing said band around said tube, whereby rotation of said shaft in first one and then the opposite direction will cause said deformable material to turn about said pivot mounting as it rotates around the outer surface of said tube.

HAROLD E. DARNEY.

References Cited in the file of this patent

UNITED STATES PATENTS

| Number | Name | Date |
|---|---|---|
| 478,093 | Derham | July 5, 1892 |
| 1,196,081 | Carence | Aug. 29, 1916 |
| 1,388,835 | Norris | Aug. 23, 1921 |
| 1,460,092 | Cole | June 26, 1923 |
| 1,842,313 | Chaney | Jan. 19, 1932 |
| 2,000,377 | Creighton | May 7, 1935 |
| 2,072,417 | Berndt et al. | Mar. 2, 1937 |
| 2,160,099 | Zeligman et al. | May 30, 1939 |